United States Patent
Rolando et al.

(10) Patent No.: US 8,272,983 B2
(45) Date of Patent: *Sep. 25, 2012

(54) PULLEY TENSIONER FOR A BELT DRIVE FOR USE IN CONTACT WITH OIL

(75) Inventors: Adriano Rolando, Valperga Canavese (IT); Gianluca Pane, Ivrea (IT)

(73) Assignee: Dayco Europe S.R.L., Chieti (IT)

( * ) Notice: Subject to any disclaimer, the term of this patent is extended or adjusted under 35 U.S.C. 154(b) by 196 days.

This patent is subject to a terminal disclaimer.

(21) Appl. No.: 12/312,978

(22) PCT Filed: Dec. 4, 2006

(86) PCT No.: PCT/IT2006/000836
§ 371 (c)(1),
(2), (4) Date: Feb. 4, 2010

(87) PCT Pub. No.: WO2008/068782
PCT Pub. Date: Jun. 12, 2008

(65) Prior Publication Data
US 2011/0045929 A1 Feb. 24, 2011

(51) Int. Cl.
*F16H 7/10* (2006.01)
(52) U.S. Cl. .................................... 474/112
(58) Field of Classification Search ............... 474/112; 184/7.1; 384/288, 289, 293, 322, 372, 396
See application file for complete search history.

(56) References Cited

U.S. PATENT DOCUMENTS

| | | | |
|---|---|---|---|
| 3,934,947 A * | 1/1976 | Walter et al. | 384/111 |
| 4,689,037 A * | 8/1987 | Bytzek | 474/135 |
| 4,721,495 A | 1/1988 | Kan et al. | |
| 5,558,587 A | 9/1996 | Church | |
| 5,620,385 A * | 4/1997 | Cascionale et al. | 474/112 |
| 5,759,125 A | 6/1998 | Berg | |
| 5,993,340 A * | 11/1999 | Rocca et al. | 474/109 |
| 6,761,483 B1 * | 7/2004 | Michiels | 384/107 |
| 6,857,979 B2 | 2/2005 | Macnaughton et al. | |
| 7,165,521 B2 * | 1/2007 | Nakajima | 123/90.17 |
| 7,273,432 B2 * | 9/2007 | Schonmeier et al. | 474/135 |
| 7,611,431 B2 * | 11/2009 | Dinca et al. | 474/112 |
| 7,637,829 B2 | 12/2009 | Stone et al. | |
| 7,874,950 B2 | 1/2011 | Lehtovaara et al. | |

(Continued)

FOREIGN PATENT DOCUMENTS
DE 4313058 10/1993
(Continued)

OTHER PUBLICATIONS

International Search Report and Written Opinion mailed Oct. 23, 2007 in application PCT/IT2006/000836.

(Continued)

*Primary Examiner* — Michael Mansen
*Assistant Examiner* — Mark K Buse
(74) *Attorney, Agent, or Firm* — Davidson Berquist Jackson & Gowdey, LLP

(57) ABSTRACT

A tensioner for a belt drive comprises a pivot defining an axis, a support hinged to the axis and defining a guiding surface preferably having a circular profile, an elastic element for actuating the support and a crown pulley eccentric with respect to the axis and surrounding the guiding surface. The tensioner further comprises a journal bearing to support the pulley on the guiding surface.

19 Claims, 2 Drawing Sheets

U.S. PATENT DOCUMENTS

| | | | |
|---|---|---|---|
| 7,980,976 B2 * | 7/2011 | Stepniak et al. | 474/112 |
| 7,985,151 B2 * | 7/2011 | Singer | 474/135 |
| 2003/0083164 A1 * | 5/2003 | MacNaughton et al. | 474/135 |
| 2006/0068957 A1 | 3/2006 | Stone et al. | |
| 2008/0025658 A1 * | 1/2008 | Hochmayr et al. | 384/457 |
| 2008/0153642 A1 | 6/2008 | Baumuller et al. | |
| 2008/0287233 A1 * | 11/2008 | Cantatore | 474/112 |
| 2010/0190594 A1 * | 7/2010 | Rolando et al. | 474/112 |
| 2010/0190595 A1 * | 7/2010 | Baumuller et al. | 474/112 |
| 2011/0045929 A1 * | 2/2011 | Rolando et al. | 474/112 |
| 2011/0218066 A1 | 9/2011 | Rolando | |

FOREIGN PATENT DOCUMENTS

| | | |
|---|---|---|
| DE | 19614546 | 10/1996 |
| DE | 10021587 | 11/2001 |
| EP | 0709595 | 5/1996 |
| EP | 1746306 | 1/2007 |
| GB | 2233063 | 1/1991 |
| JP | 2004-150552 | 5/2004 |
| WO | WO 99/28652 | 6/1999 |
| WO | WO 2005/038297 | 4/2005 |
| WO | WO 2005/080820 | 9/2005 |
| WO | WO 2006/111988 | 10/2006 |
| WO | WO 2008/068782 | 6/2008 |
| WO | WO 2008/117319 | 10/2008 |
| WO | WO 2008/149390 | 12/2008 |

OTHER PUBLICATIONS

International Search Report and Written Opinion mailed Nov. 7, 2007 in PCT Appln. No. PCT/IT2007/000228.

International Search Report mailed Nov. 9, 2007 in PCT Appln. No. PCT/IT2007/000394.

U.S. Appl. No. 12/451,883—Dec. 22, 2011 PTO Office Action.

* cited by examiner

PULLEY TENSIONER FOR A BELT DRIVE FOR USE IN CONTACT WITH OIL

TECHNICAL FIELD

The present invention relates to a pulley tensioner for a belt drive for use in contact with oil, for example for a timing drive of an internal combustion engine.

BACKGROUND ART

Timing drives generally comprise either an oil-lubricated chain or a toothed belt running in a dry condition. A timing drive running in contact with oil has recently been made comprising a toothed belt made so as to withstand the chemical attack of oil and to have a lifespan equal to 240000 km and 10 years in a motorcar and to 350000 km and 10 years in a light commercial vehicle.

A belt drive for use in contact with oil is lighter and causes less vibrations with respect to a chain drive. Furthermore, experimental tests have demonstrated that such drive allows to reduce consumptions with respect to a traditional chain drive.

Such advantages may now be obtained also by upgrading or retrofitting engines originally designed for a chain drive with such a belt drive. However, a chain drive presents different dimensions with respect to those of a belt drive. Therefore, in order to upgrade a chain drive to a belt drive, all the components of the latter must be fitted within vanes originally designed for the chain drive. Possibly, some non-substantial parts of the engine may be modified in a marginal manner.

In particular, a belt drive comprises an automatic tensioner and such device appears particularly critical for the assembly within a vane originally designed for a chain drive.

International patent application WO-A1-2006111988 filed by the same applicant describes a tensioner for an application in contact with oil comprising a fixed pin, a disc mounted in an eccentric manner on the pin and actuated by a tensioning spring and a pulley mounted in a concentric manner on the disc by means of a ball bearing. Furthermore, the tensioner comprises a friction damping device to appropriately dampen the oscillations of the belt also in the presence of oil.

Such tensioner is compact in the axial direction but presents relatively high dimensions along the radial direction and therefore cannot be used when the accommodation compartment for the drive presents a particularly complex geometry.

DISCLOSURE OF INVENTION

It is the object of the present invention to provide a pulley tensioner free from the aforesaid drawback.

The aforesaid object is achieved by a pulley tensioner according to claim 1.

BRIEF DESCRIPTION OF THE DRAWINGS

For a better understanding of the present invention, a preferred embodiment thereof will be described only by way of non-limitative example and with reference to the accompanying drawings, in which.

BEST MODE FOR CARRYING OUT THE INVENTION

Figure 1:
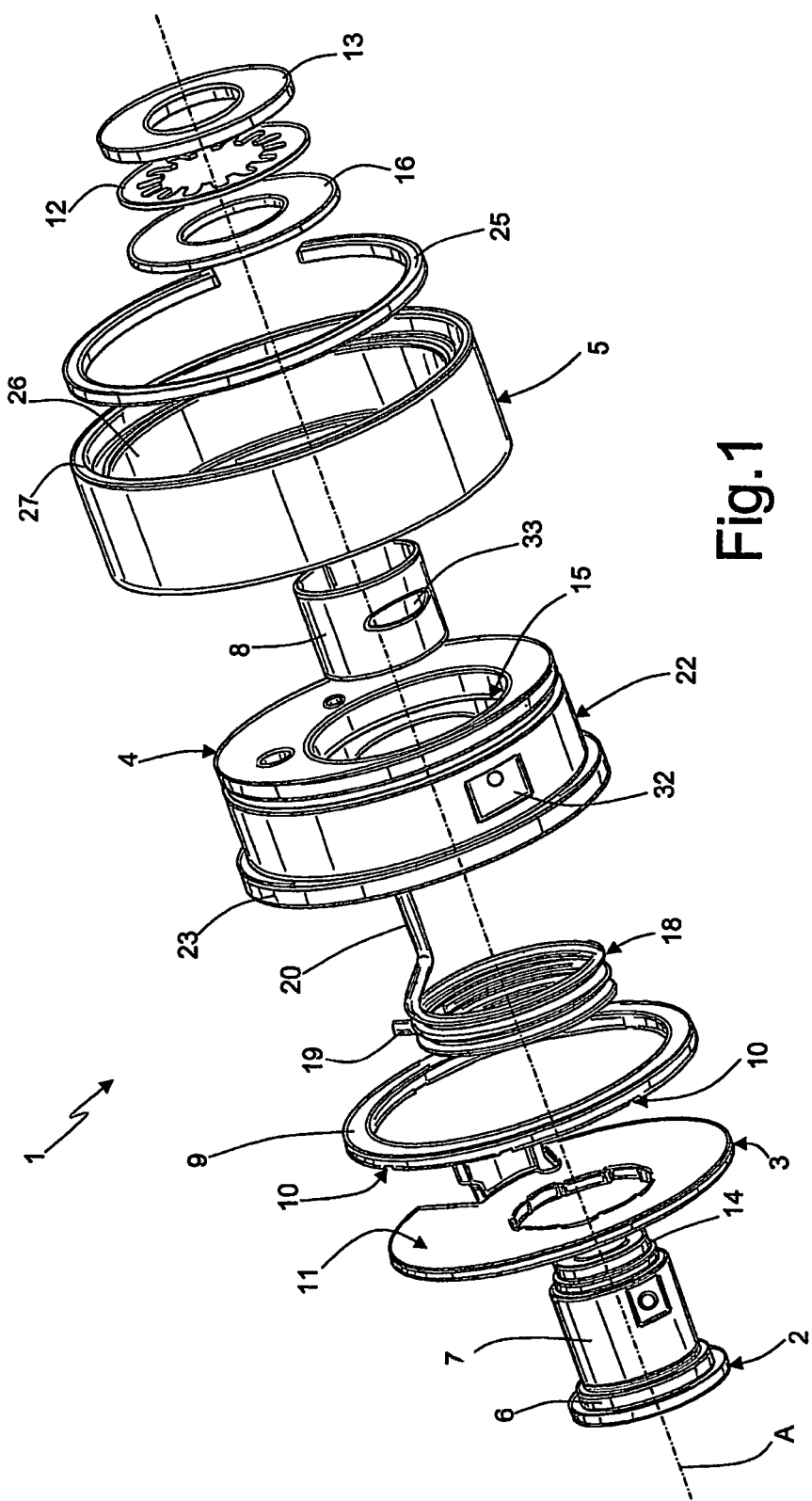
FIG. 1 is a perspective exploded view of the tensioner according to the present invention.

With reference to FIG. 1, numeral 1 indicates as a whole a pulley tensioner for a timing belt drive comprising a pivot 2 defining an axis A and a plate 3 rigidly mounted on pivot 2 and perpendicular to axis A. Tensioner 1 further comprises a disc 4 mounted on pivot 2 in an eccentric manner with respect to axis A and an annular pulley 5 mounted in concentric manner on plate 4 and rotatable about an axis B parallel to and distanced from axis A.

Specifically, pivot 2 integrally defines a base 6 rigidly connected to plate 3 and a cylindrical portion 7 defining axis A for guiding the rotation of disc 4.

Disc 4 is radially supported on cylindrical portion 7 by means of a bushing 8 and rests in axial direction on plate 3 by means of a friction ring 9.

Friction ring 9 is fixed with respect to disc 3 and presents a plurality of preferably radial grooves 10 cooperating with a sliding surface 11 of plate 3. In use, the oil present between friction ring 9 and plate 3 is evacuated by means of grooves 10 and the value of the damping torque consequently increases.

In order to apply a high axial load adapted for a use in presence of oil, tensioner 1 comprises a Belleville spring 12 and a lid 13 rigidly connected to a head portion 14 of pivot 2 to load Belleville spring 12 in axial direction and consequently apply a force parallel to axis A on friction ring 9.

Preferably, disc 4 defines a circular recess 15 arranged on axially opposite side with respect to plate 3 to accommodate Belleville spring 12 and lid 13 with radial clearance.

Preferably, moreover, an annular element 16 is interposed between disc 4 and Belleville spring 12 to prevent damage to disc 4 caused by the relative motion.

Disc 4 presents a height essentially equal to that of pulley 5 and further defines an annular cavity 17 (FIG. 2) open towards plate 3 and accommodating a tensioning coil spring 18 concentrically arranged to pivot 2. In particular, tensioning spring 18 presents a smaller diameter with respect to that of friction element 9 and comprises a first end portion 19 fixed with respect to pivot 2 and a second end portion 20 fixed with respect to disc 4.

Annular cavity 17 further accommodates an axial protrusion 21 preferably obtained by bending a portion of plate 3 radially arranged between tensioning spring 18 and friction ring 9.

Specifically, annular cavity 17 is shaped so as to define two stoppers (not shown) to limit the maximum angular travel of disc 4 with respect to plate 3 by means of axial protrusion 21.

In order to allow the relative rotation of pulley 5 with respect to disc 4 the tensioner further comprises a journal bearing as described below.

Specifically, disc 4 defines a peripheral cylindrical surface 22 surrounded by pulley 5, a shoulder 23 radially protruding with respect to cylindrical surface 22 and having a continuous annular profile, and a seat configured for the assembly of an elastic ring 25 preferably coated with an anti-wear material. Elastic ring 25 is arranged on the opposite axial side of shoulder 23 with respect to cylindrical surface 22 and defines the axial position of pulley 5.

Preferably, cylindrical surface 22 presents a roughness Ra ranging from 0.3 to 0.9 microns and the corresponding cylindrical surface which defines central body 26 presents a roughness Ra ranging from 0.2 to 0.8 microns. Such values allow to reduce the wear between disc 4 and pulley 5.

Pulley 5 presents a central body 26 mounted with a predetermined radial clearance at ambient temperature on cylindrical surface 22 and mounted with axial clearance between shoulder 23 and elastic ring 25, and two wings 27 symmetrically protruding from opposite sides of central body 26 and surrounding shoulder 23 and elastic ring 25.

Furthermore, pivot 2 defines an oil feeding conduit 28 having an inlet 29 defined on the supporting face of base 6 and a radially arranged outlet 30.

Disc 4 further defines a radial conduit 31 having an inlet facing pivot 2 and an outlet communicating with a sump 32 recessed with respect to cylindrical surface 22.

Specifically, radial conduit 31 is axially arranged between recess 15 and cavity 17 and is coaxial to output 29 of conduit 28. The axis of radial conduit does not lie on the middle line of cylindrical surface 22 and of pulley 5 because of the axial dimension of coil spring 18, whereas sump 32 is symmetric with respect to the centre line of cylindrical surface 22 to allow a symmetric action on pulley 5.

Conveniently, moreover, bushing 8 presents a gap 33 having a circumferential dimension so as to allow the passage of oil in any relative angular position of disc 4 with respect to pivot 2 without causing any throttling or choking while oil flows from outlet 30 towards radial conduit 31.

Furthermore, the choice of materials used to manufacture disc 4 and pulley 5 is such that the material of disc 4 presents a higher thermal expansion coefficient with respect to that of the material used for pulley 5.

Preferably, disc 4 is manufactured in aluminum and pulley 5 in steel.

Furthermore, tensioner 1 comprises an axial seal to avoid that the oil entering into to radial conduit 31 escapes along bushing 8 before reaching sump 32.

Specifically, the seal is supported by a tubular portion 34 of disc 4 protruding within cavity 17 towards plate 3 and accommodating a portion of bushing 8 and of pivot 2.

Preferably, the seal comprises a gasket, e.g. an o-ring 35 accommodated in an annular seat 36 carried by tubular portion 34 and cooperating with cylindrical portion 7 of pivot 2.

The operation of tensioner 1 is as follows.

Tensioner 1 is mounted on the internal wall of an internal combustion engine vane which presents a port connected to the oil pump delivery. Furthermore, the plane crossing axis A and radial conduit 31 is arranged in a predetermined position with respect to the resultant of the action of the belt on pulley 5 in a resting condition of the drive.

Specifically, such plane precedes the resultant of the action of the belt on pulley 5 with respect to the rotation of pulley 5 during operation by an angle comprised between 60° and 130°.

Figure 2:
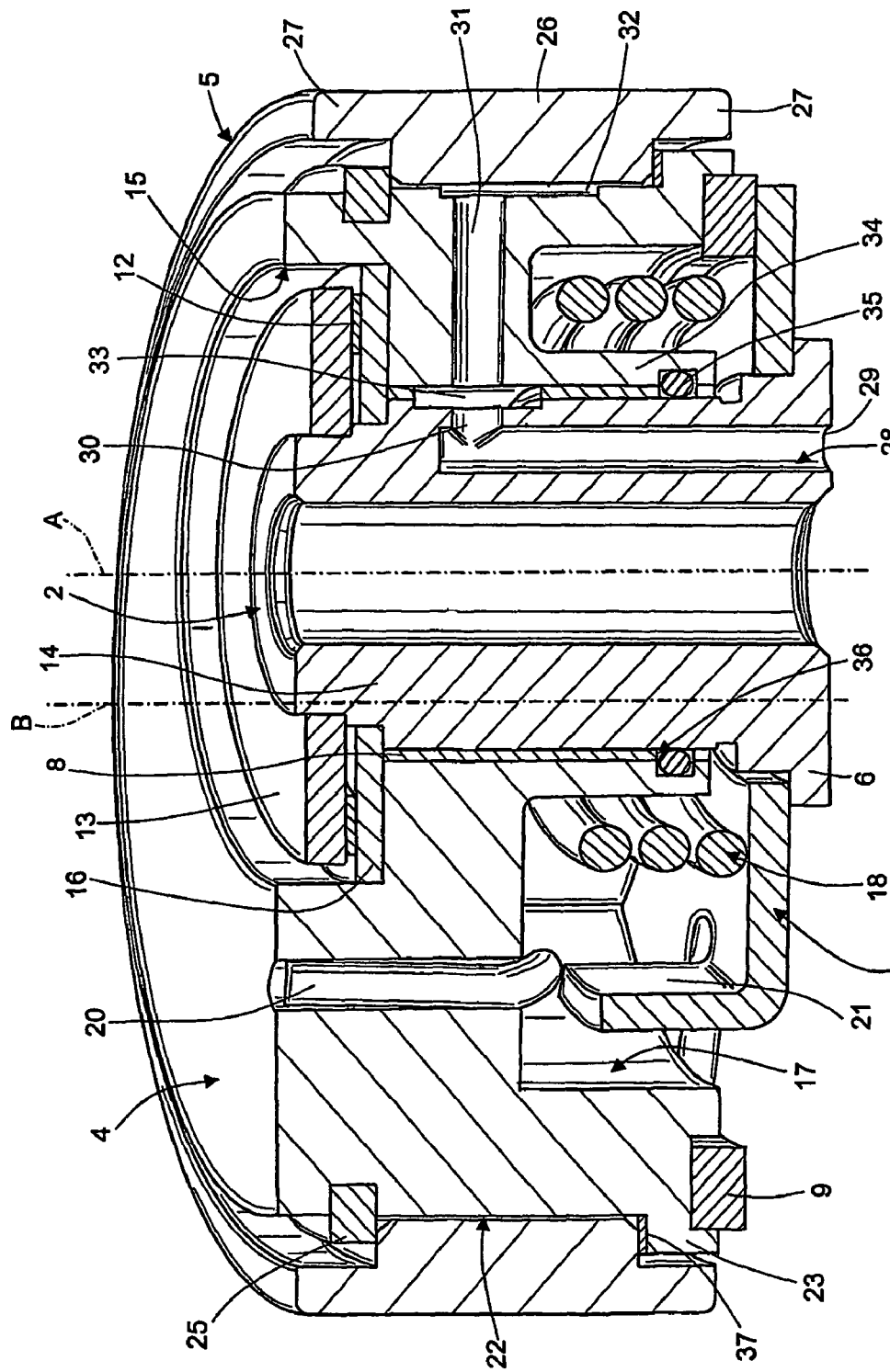
FIG. 2 is a section along an axial plane of the tensioner in FIG. 1.

For example, in relation to FIG. 2, if pulley 5 turns clockwise viewing from portion 14 towards base 6, the resultant of the action applied by the belt enters in the sheet and presents an angle of 90° with respect to the axis of radial conduit 31.

The action of the belt on pulley 5 is asymmetric and tends to bring pulley 5 closer to cylindrical surface 22 so that the minimum radial distance between pulley 5 and cylindrical surface 22 is arranged between the resultant of the action of the belt on pulley 5 itself and the axis of radial conduit 31.

In this way, when pulley 5 turns with respect to disc 4, a hydrodynamic force is generated which maintains pulley 5 suspended with respect to cylindrical surface 22 there being interposed an oil gap.

The oil is continuously fed by means of conduit and subsequently exits from the passages defined between central body 26, shoulder 23 and elastic ring 25 to reach the oil pump intake by means of the engine lubrication circuit.

As it is known, the hydrodynamic force is directly proportional to the viscosity of the fluid and is inversely proportional to the height of the oil gap according to Reynolds's equation.

Furthermore, the viscosity of the oil tends to decrease with the increase of temperature but such effect is opposed by the corresponding decrease of the height of the oil gap due to the fact that disc 4 expands more than pulley 5 because it is manufactured in aluminum while pulley 5 is manufactured in steel.

In this way, it is possible to compensate the decreasing of viscosity with a corresponding decreasing of the height of the oil gap. The result is that tensioner 1 essentially maintains the hydrodynamic force on pulley 5 constant with respect to a variation of the temperature.

Furthermore, tensioner 1 is fed by a circuit which, beyond a predetermined number of engine revolutions, maintains its delivery pressure constant by means of a pressure limiting valve mounted in series to the delivery of a constant displacement pump.

Tensioner 1 is arranged in parallel with respect to other loads and receives a flow depending on the total loss of pressure which the oil encounters while flowing through tensioner 1.

By means of the choice of materials, the radial gap tends to decrease such that the total hydraulic resistance increases and consequently compensates for the increase of flow due to the decrease of oil viscosity.

In the condition in which the oil circuit is at constant pressure, it therefore results that tensioner 1 maintains the required flow essentially constant with respect to a variation of temperature.

The pressure limiting valve controls the oil circuit when the number of engine revolutions exceeds a predetermined value. When the engine runs under such predetermined number of revolutions, such as for example at slow speed, the oil flow is relatively low and it is important to reduce the leakage of oil to allow the access of a minimum flow rate towards sump 32.

For this purpose, o-ring 35 allows to avoid an oil leakage along the axial direction towards plate 3 through the clearance between cylindrical portion 7, bushing 8 and tubular portion 34.

The oil leakage along the axial direction towards head portion 14 is prevented by a second seal. According to a preferred embodiment, such second seal is defined by annular element 16 which is fluid-tightly mounted on head portion 14 and is loaded by means of Belleville spring 12 so that the load closes the axial clearances and prevents a leakage of oil.

The advantages that the tensioner 1 according to the present invention allows to obtain are as follows.

The journal bearing between pulley 5 and disc 4 allows to eliminate the ball bearing and therefore to considerably reduce the radial dimensions of tensioner 1 and the cost thereof.

Moreover, the materials of disc 4 and pulley 5 are selected such that the hydrodynamic force and the required flow are essentially constant when the oil circuit pressure is controlled by the pressure limiting valve.

The axial seals defined by annular element 16 and by o-ring 35 allow to reduce the leakage of oil. A reduced oil consumption allows to guarantee the correct operation of tensioner 1 also when the engine speed is slow and the feeding flow rate is reduced. Furthermore, a reduced consumption of oil is preferable because it may allow, in some applications, to fit the tensioner aboard engines without requiring the increase of the oil pump displacement and power. Such result represents a considerable cost advantage when it is expected to upgrade an engine originally designed for a chain drive.

The assembly of pulley 5 on disc 4 by means of elastic ring 25 is particularly simple and relatively inexpensive and allows to obtain the required precision to correctly define the axial clearance of pulley 5.

Furthermore, Belleville spring 12 allows to obtain high axial loads and reduced dimensions and therefore allows to obtain a solution both to the problem of high friction torques also in the presence of lubricating oil and of reducing the dimensions to allow to be mounted aboard engines previously designed for a chain timing drive.

The increase of friction torque is advantageously obtained also by means of the use of grooves 10 which prevent the formation of a lubricant oil gap between ring 9 and plate 3.

Sump 32 allows to make the oil distribution along the height of cylindrical surface 22 symmetric so as to avoid imbalances of pulley 5.

It is finally apparent that changes and variations can be implemented to tensioner 1 here described and illustrated without departing from the scope of protection of the accompanying claims.

In particular, friction ring 9 may be connected in a fixed manner to plate 3 and cooperate in contact with a specific fixed surface with respect to disc 4.

Furthermore, a ring 37 may be provided in axial abutment against shoulder 23 to guide central body 26. Preferably, such ring presents an anti-friction or anti-wear layer facing central body 26 to avoid damage due to the relative movement and the rubbing against pulley 5.

Still more preferably, such ring is formed by steel and the layer is formed by surface manganese phosphating. It is possible to contemplate that a ring equal to that previously described is abuttingly arranged against elastic ring 25.

The invention claimed is:

1. A tensioner for a belt drive comprising a pivot defining an axis (A), a support hinged to said axis (A) and defining a guiding surface having a circular profile, an elastic element for actuating said support and a crown pulley mounted on said support about said guiding surface and rotatable about a second axis (B) eccentric with respect to said axis (A), and a journal bearing to support said pulley on said guiding surface wherein said journal bearing comprises a first conduit transversal to said axis (A) and defining an outlet for feeding oil onto said guiding surface, and said guiding surface is axially delimited by first and second shoulders and defines an axially symmetric recess fluidly connected to said first conduit to exert a symmetric action on said pulley.

2. A tensioner according to claim 1, wherein said support is manufactured in a material having a first thermal expansion coefficient and in that said pulley is manufactured in a material having a second thermal expansion coefficient lower than said first thermal expansion coefficient.

3. A tensioner according to claim 1, further comprising a ring axially interposed between one of said first and second shoulders and said pulley.

4. A tensioner according to claim 3, wherein said first conduit (31) is defined by said support (4).

5. A tensioner according to claim 4, wherein said pivot defines a second conduit adapted to be fed by a flow rate of pressurised fluid and fluidly connected to said first conduit.

6. A tensioner according to claim 5, wherein said support is radially supported on said pin by means of a bushing defining a gap to allow the passage of oil between said first conduit and said second conduit.

7. A tensioner according to claim 1 wherein at least one of said first and second shoulders is defined by an elastic ring.

8. A tensioner according to claim 7, wherein said seal comprises an o-ring carried by said support and cooperating with said pin.

9. A tensioner according to claim 1, further comprising a seal to avoid leakage of oil along an axial direction.

10. A tensioner according to claim 9, wherein said seal comprises an element loaded in axial direction by means of a second elastic element.

11. A tensioner according to claim 10, further comprising a friction element (9) cooperating in relative motion with a contact surface (11) transversally arranged with respect to said axis (A), said elastic element (12) maintaining contact with said friction element (9) and said contact surface (11).

12. A tensioner according to claim 11, wherein said friction element (9) presents at least one groove (10) facing said contact surface (11).

13. A tensioner according to claim 1, wherein said first conduit precedes the resultant of the action of said belt on said pulley by an angle comprised between 60° and 130°.

14. A tensioner for a belt drive comprising:
a pivot defining an axis (A),
a support hinged to said axis (A) and having a guiding surface with a circular profile,
an elastic element for actuating said support,
a crown pulley mounted on said support about said guiding surface and rotatable about a second axis (B) eccentric with respect to said axis (A),
a journal bearing to support said pulley on said guiding surface and adapted to be fed by a flow rate of pressurised fluid with the fluid flow for the journal bearing passing through interconnected conduits defining a specific path through the pivot and through said support, and
a seal radially positioned between the pivot and the support to avoid oil leaks in an axial flow direction.

15. A tensioner according to claim 14, wherein said support is manufactured in a material having a first thermal expansion coefficient and in that said pulley is manufactured in a material having a second thermal expansion coefficient lower than said first thermal expansion coefficient.

16. A tensioner according to claim 15, wherein said journal bearing includes a first conduit positioned transverse to said axis A and an outlet for feeding oil onto said guiding surface.

17. A tensioner according to claim 16, wherein said guiding surface is axially delimited by a first and second shoulders and defines an axially symmetric recess fluidly connected to said first conduit to exert a symmetric action on said pulley.

18. A tensioner according to claim 14, further comprising a sealing element loaded in axial direction by means of a second elastic element to avoid leakage of oil along an axial direction.

19. A tensioner for a belt drive comprising a pivot defining an axis (A), a support hinged to said axis (A) and defining a guiding surface having a circular profile, an elastic element for actuating said support and a crown pulley mounted on said support about said guiding surface and rotatable about a second axis (B) eccentric with respect to said axis (A), and a journal bearing to support said pulley on said guiding surface, said journal bearing comprising a first conduit positioned transverse to said axis (A) and defining an outlet for feeding oil onto said guiding surface, and said first conduit precedes the resultant of the action of said belt on said pulley by an angle comprised between 60° and 130°.

* * * * *